E. H. STUDEBAKER.
WAGON RACK.
APPLICATION FILED AUG. 12, 1913.

1,108,942.

Patented Sept. 1, 1914.
3 SHEETS—SHEET 2.

Witnesses

Inventor
E. H. Studebaker
By
Attorneys

E. H. STUDEBAKER.
WAGON RACK.
APPLICATION FILED AUG. 12, 1913.
1,108,942.
Patented Sept. 1, 1914.
3 SHEETS—SHEET 3.
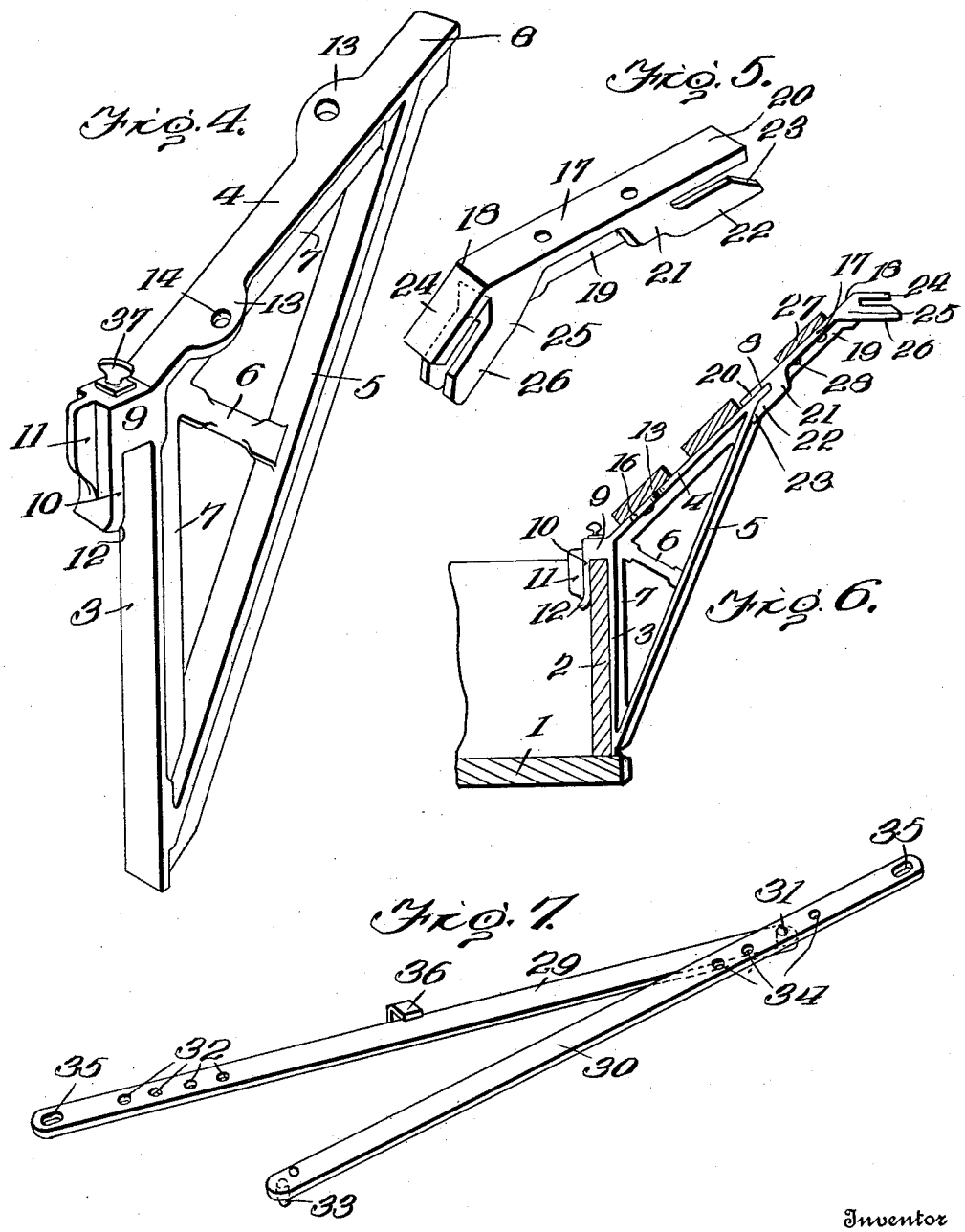

UNITED STATES PATENT OFFICE.

ENOCH H. STUDEBAKER, OF WAVERLY, VIRGINIA, ASSIGNOR OF ONE-HALF TO JOHN L. BIRDSONG, OF KENBRIDGE, VIRGINIA.

WAGON-RACK.

1,108,942.  Specification of Letters Patent.  Patented Sept. 1, 1914.

Application filed August 12, 1913. Serial No. 784,461.

*To all whom it may concern:*

Be it known that I, ENOCH H. STUDEBAKER, citizen of the United States, residing at Waverly, in the county of Sussex and State of Virginia, have invented certain new and useful Improvements in Wagon-Racks, of which the following is a specification.

This invention relates to wagon racks and has as its object to provide a rack which may be readily applied to and removed from wagon bodies of different sizes and which may be readily converted into a hay rack or stock rack or inclosure as occasion may require.

It is one aim of the invention to provide a wagon rack bracket of such construction that it will support a maximum load although in itself light in weight and, as stated, capable of ready application to and removal from a wagon body.

Another aim of the invention is to provide an auxiliary supporting member for use in connection with the bracket, which member may be employed either for the purpose of adding to the length of the supporting portion of the bracket and thereby adapting the rack to contain a larger load of hay or the like, or which may be reversed together with the bracket so as to extend over the interior of the wagon box and thereby adapt the rack for use as a stock rack or inclosure.

Another feature of the invention resides in the novel manner in which connection is provided between the rack proper and the auxiliary supporting member, the object being to render this connection practically as substantial as if the rack and extension were formed in one piece.

The invention also has as its object to provide a novel means for bracing the racks mounted upon opposite side walls of the wagon box so as to effectually provide against spreading of the box or sagging of the racks at their middles, this connection being so constructed that it may be adjusted to adapt the rack for application to wagon boxes of various widths without the necessity, however, of employing tools of any character in securing the desired adjustment.

Figure 1:
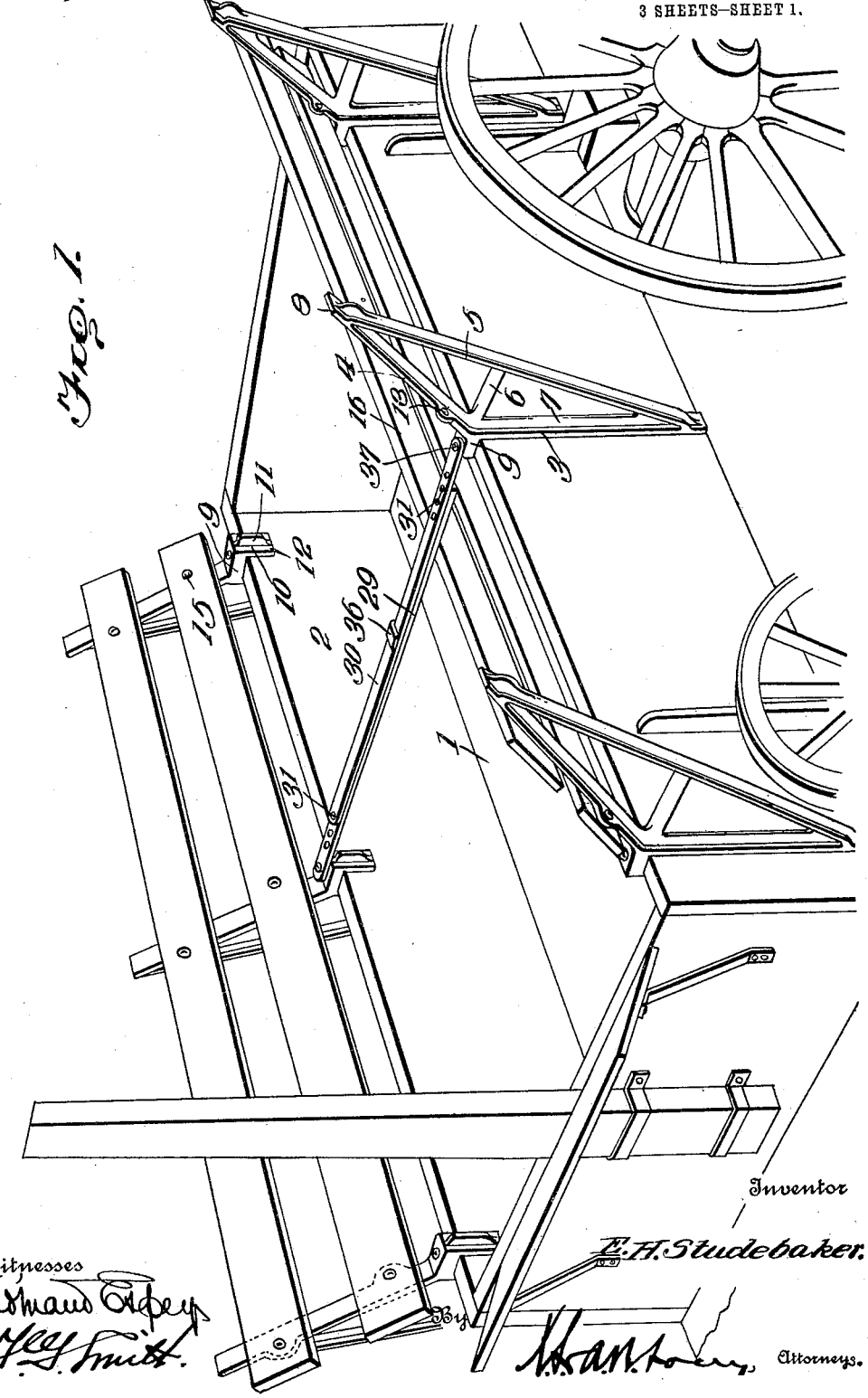
Figure 2:
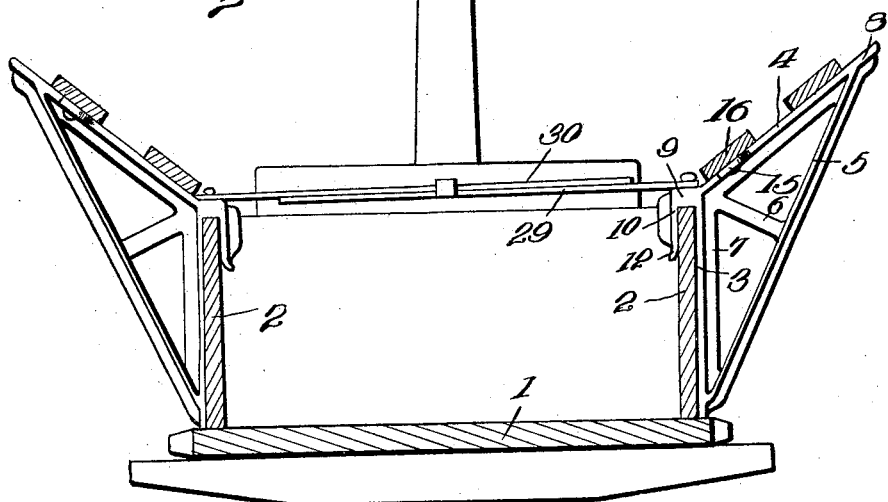
Figure 3:
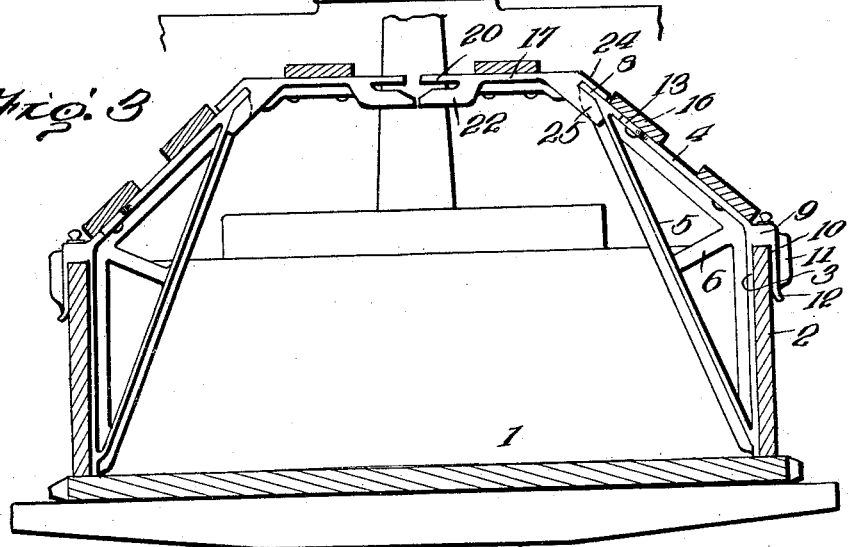

In the accompanying drawings: Figure 1 is a perspective view of a rack embodying the present invention mounted upon a wagon box, the auxiliary supporting members being detached and the rack being arranged to serve as a hay rack. Fig. 2 is a vertical transverse sectional view through the racks and the wagon box, the racks being arranged as shown in Fig. 1 of the drawings. Fig. 3 is a view similar to Fig. 2 but illustrating the racks arranged to serve as a stock rack or inclosure. Fig. 4 is a perspective view of one of the rack brackets. Fig. 5 is a similar view of one of the auxiliary supporting members detached. Fig. 6 is a similar view to Fig. 2, illustrating the auxiliary supporting member applied to the bracket. Fig. 7 is a perspective view of the connecting member for bracing the racks.

In the drawings the wagon box upon which the racks embodying the present invention are mounted is indicated in general by the numeral 1 and its side boards are indicated at 2. Each of the rack brackets is substantially triangular in form and consists of a standard portion 3, a supporting portion 4, and a bracing portion 5. The bracket is additionally braced by means of a bracing portion 6 which extends between the portion 5 and the angle between the intersection of the portions 3 and 4. Preferably each of the portions 3, 4 and 5 is provided upon its outwardly presented side with a flange 7 which further serves to reinforce these portions and consequently the bracket as a whole, it being observed that the body portions of the parts 3 and 4 project at their lateral edges beyond the sides of the flanges 7 and such projecting portions of the supporting portions 4 at their outer ends thereof are indicated specifically by the numeral 8 and serve a purpose to be presently explained. The standard portion 3 of each bracket at its upper end, or, in other words, at the angle of intersection of this portion with the supporting portion 4, is formed with a boss 9 having a downwardly projecting lip 10 preferably reinforced by a flange 11 formed upon its outer face. The lip 10 has its inner face lying parallel to the opposing face of the standard portion 3 and at its lower end is beveled as at 12 so that the lip may be readily fitted or engaged over the upper edge of one of the side boards of a wagon box, the said edge portion of the side board being received between the lip and the opposing face of the standard portion 3, which face of the standard portion rests flat against the outer side of the side board as clearly shown in Figs. 2, 3 and 6 of the drawings, and extends preferably, although not necessarily, the entire height of the board.

For a purpose to be presently pointed out the lateral edges of the supporting portion 4 of each bracket are formed each with an ear 13 occupying the same plane as the body portion of the said supporting member and these ears are apertured as at 14 for the passage of bolts or other suitable securing devices 15 which serve to hold the boards 16 of the rack upon the supporting portions of the brackets of the rack. In the present instance three brackets are employed in the construction of each rack and two boards are used, but it will be understood that a greater or less number of brackets and a greater or less number of boards 16 may be made use of if desired. In order that the strain upon the brackets may be equalized, one of the ears 13 of each supporting portion is located near the inner end of the said portion at one edge thereof and the other ear is located near the outer end of the portion and at the other edge thereof. It will now be seen that each of the racks consists of a number of the brackets secured to and supporting one or more boards 16 and it will be apparent that when the racks are to be applied to or removed from the side boards of a wagon box the lips 10 of all of the brackets comprising the rack are engaged over or disengaged from the upper edge of the side board.

As before stated, there is employed in connection with each of the brackets proper, an auxiliary supporting member and this member is clearly illustrated in Fig. 5 of the drawing. The member may be said to consist of two relatively angularly extending portions, one of which, indicated by the numeral 17, constituting the body portion of the member and the other, indicated in general by the numeral 18, being of a form which will be presently fully described. The portion 17 corresponds in general cross sectional shape to the body portion of the supporting part 4 of the bracket and includes a flange 19 which corresponds to the flange 7 of the supporting member 4. This flange 19 at one end of the body portion 17 is cut away so as to form a lip 20 which occupies the same plane as the body portion proper and the flange 19 below the lip is increased in thickness as at 21 and bifurcated to form spaced fingers 22 extending beneath the lateral edges of the lip 20 and having their upper edges at their ends beveled as at 23 for a purpose to be presently explained. The portion 18 of the auxiliary supporting member consists of a lip 24 corresponding to the lip 20 except that, as before stated, the portion 18 extends at an angle to the portion 17. The flange 19 at this end of the member is increased in thickness as at 25 and bifurcated to form fingers 26 corresponding to the fingers 22 and extending in spaced relation to the lip 24 in the same manner as do the fingers 22. One of the auxiliary supporting members is provided in connection with each of the brackets shown in Fig. 4 of the drawings, and these auxiliary members are connected by one or more boards 27 secured in any suitable manner as for example, by bolts 28, to the upper sides of the portions 17 of the said members.

By reference to Figs. 3 and 6 of the drawings it will be observed that either end of the auxiliary supporting member shown in Fig. 5 may be applied to the end of the respective bracket and that when so applied the lip 20 or 24 as the case may be, will overlap the end of the portion 8 of the bracket and the fingers 22 or 26 will straddle the end of the flange 7 of the portion 4 of the bracket and engage at their upper edges beneath the projecting edge portions 8. It is to be noted that the portion 17 of the auxiliary supporting member is of considerably greater length than the portion 18 thereof so that when that end of the member at which the lip 20 and the fingers 22 are located, is applied to the end of the supporting portion of the bracket, the capacity of the rack when it is to contain hay or the like, is materially increased due to the additional length given the supporting portions of the brackets comprising the rack.

As shown in Fig. 3 of the drawings, the structure may be readily converted into a stock rack or inclosure by reversing the positions of the two racks or, in other words, so applying them to the side boards of the wagon box that they will project or extend inwardly instead of outwardly, the portions 18 of the auxiliary supporting members being in this case fitted to the ends of the supporting portions of the brackets so that the portions 17 of the said members will extend over the interior of the wagon box with their ends at which the lips 20 and fingers 22 are located in proximity to each other.

The means heretofore mentioned for the purpose of bracing the racks and preventing bulging of the side boards of the wagon box consists essentially of two bars, one indicated by the numeral 29 and the other by the numeral 30, the bar 29 being provided at one end with a stud 31 and adjacent its other end with a longitudinally extending series of openings 32, and the other bar being similarly provided at one end with a stud 33 and adjacent its other end with a series of openings 34. The last mentioned ends of the bars are provided each with a slot 35 and the bar 29 at a point approximately midway between its ends is provided with an overhanging lug 36 which extends above and in spaced relation with respect to the upper side of the bar and is adapted to engage over the bar 30 when the bars are in superposed relation.

In order that the bars may be applied to the brackets comprising the racks, the boss 9 of each bracket is formed with a stud 37 the head of which extends transversely of the boss and is of a size to be engaged through the slots 35, it being understood that the bars are initially positioned with the slots in alinement with the heads 37 and that the bars are then swung around upon the studs as pivots until they overlap and the bar 30 is engaged between the lug 36 and the bar 29. The bars having then been relatively moved so that the length of the connection will be equal or substantially equal to the width of the wagon box, the stud carrying ends of the bars are sprung and the studs 31 and 33 are engaged in the proper ones of the series of openings 34 and 32 respectively.

From the foregoing description of the invention it will be seen that I have provided a wagon rack which may be readily and quickly applied to any standard wagon box and which may be converted, without the use of tools of any character, into a hay rack or stock rack or inclosure, and it will further be seen that the connection provided between the racks, while not absolutely essential under all conditions, is when employed, substantial and capable of effectually preventing lateral displacement of the racks or bulging of the side boards of the wagon box.

A decided advantage accruing from the formation of the brackets in two sections is that by detaching the sections shown in Fig. 5, the upper ends of the main brackets will not project beyond the hubs of the wagon wheels and consequently the wagon may be conveniently driven through restricted spaces as long as the passageway is sufficiently wide to permit of clearance of the hubs.

Having described my invention, what I claim is:

1. In a wagon rack bracket, a standard portion, a supporting portion, and an auxiliary supporting member having relatively angularly disposed portions adapted to be interchangeably removably fitted to the supporting portion of the bracket.

2. In a wagon rack bracket, a standard portion, a supporting portion, and an auxiliary supporting member having relatively angularly disposed portions adapted to be interchangeably removably fitted to the supporting portion of the bracket, one of the angularly disposed portions of the supporting member being of greater length than the other portion thereof whereby when fitted to the supporting portion of the bracket to constitute an extension of the said portion.

3. In a wagon rack bracket, a standard member, a supporting member including a transversely extending portion and a flange extending at an angle to the plane thereof, and an auxiliary supporting member having a lip and spaced fingers extending beneath the lip, the lip overlapping the transversely extending portion of the supporting member and the fingers straddling the flange and engaging at their edges against that face of the transversely extending portion from which the flange projects.

4. In a wagon rack bracket, a standard member, a supporting member having a transversely extending body portion and an angularly extending flange, and an auxiliary supporting member having relatively angularly positioned portions each provided at its end with a lip engageable over the transversely extending body portion of the supporting member and spaced fingers engageable against the sides of the flange and at their edges against the said transversely extending portion.

5. In a wagon rack bracket, a standard portion, a supporting portion, and an auxiliary supporting member having relatively angularly positioned portions, each provided at its end with spaced members arranged to fit the end of the supporting portion of the bracket, the engagement of the ends of the auxiliary supporting member with the supporting portion of the bracket being interchangeable.

In testimony whereof I affix my signature in presence of two witnesses.

ENOCH H. STUDEBAKER. [L. S.]

Witnesses:
C. P. NEBLETT,
L. D. BIRDSONG.